(12) United States Patent
Trull (10) Patent No.: US 7,063,481 B2
(45) Date of Patent: Jun. 20, 2006

(54) CONNECTOR BLOCK FOR MODULAR CONSTRUCTION AND OBJECT FABRICATED THEREFROM

(76) Inventor: Scott E. Trull, 304 Wilson Ave., Rothschild, WI (US) 54474

( * ) Notice: Subject to any disclaimer, the term of this patent is extended or adjusted under 35 U.S.C. 154(b) by 59 days.

(21) Appl. No.: 10/640,365

(22) Filed: Aug. 13, 2003

(65) Prior Publication Data

US 2005/0036829 A1 Feb. 17, 2005

(51) Int. Cl.
*F16B 17/00* (2006.01)

(52) U.S. Cl. ............... 403/170; 403/217; 403/346; 403/396; 403/400; 52/655.1; 135/120.3; 446/126

(58) Field of Classification Search ........ 403/217–219, 403/169–171, 175–176, 346, 396, 400; 446/128, 446/124, 126; 52/653.1, 655.1, 655.2, 90.1, 52/639; 135/121, 120.2, 120.3
See application file for complete search history.

(56) References Cited

U.S. PATENT DOCUMENTS

| | | | | |
|---|---|---|---|---|
| 2,843,971 A | * | 7/1958 | Gardellin | 446/126 |
| 3,272,540 A | * | 9/1966 | Glanzer | 403/218 |
| 3,625,235 A | * | 12/1971 | Gorgichuk | 135/87 |
| 3,681,870 A | * | 8/1972 | Alpert | 446/122 |
| 3,921,360 A | | 11/1975 | Baldwin | |
| 4,271,654 A | * | 6/1981 | Jungbluth | 52/637 |
| 4,294,561 A | * | 10/1981 | Chapman et al. | 403/219 |
| 4,326,354 A | * | 4/1982 | Hagberg | 446/126 |
| 4,769,962 A | * | 9/1988 | Pohl et al. | 52/273 |
| 4,925,330 A | | 5/1990 | Cornish | |
| 5,549,408 A | * | 8/1996 | Lo | 403/218 |
| 5,556,219 A | | 9/1996 | Mason | |
| 5,803,782 A | * | 9/1998 | Selton | 446/126 |
| 6,032,430 A | | 3/2000 | Soukup | |
| 6,068,009 A | * | 5/2000 | Paes et al. | 135/117 |
| 6,108,984 A | | 8/2000 | Davidson | |
| 6,145,226 A | * | 11/2000 | Finlayson | 40/310 |
| 6,168,031 B1 | * | 1/2001 | Schmidt | 211/46 |
| 6,273,633 B1 | | 8/2001 | Husson et al. | |
| 6,413,004 B1 | | 7/2002 | Lin | |

FOREIGN PATENT DOCUMENTS

DE 3232590 A1 * 3/1984 ................. 446/124

* cited by examiner

*Primary Examiner*—Jack W. Lavinder
(74) *Attorney, Agent, or Firm*—Allen H. Erickson (57) ABSTRACT

A polymeric connector block for interconnecting a plurality of elongate tubular members into a structure has five-sided front and back sides with an orthogonal pattern of three parallel through-apertures therethrough. A fourth through-aperture passes from the left side to the right side, intersecting two of the parallel through-apertures at 90°. A non-through aperture passes from the top side and intersects the other of the parallel through-apertures at 90°. A sixth aperture extends into the block at an intermediate angle such as 45°. There are no apertures in the bottom side. Tubular members are insertable into the apertures and lockable therein by lockscrews. Tubular members may comprise tubing, pipe, electrical conduit and the like, and may include non-tubular materials such as solid rods. A wide range of structures may be created.

20 Claims, 13 Drawing Sheets

CONNECTOR BLOCK FOR MODULAR CONSTRUCTION AND OBJECT FABRICATED THEREFROM

BACKGROUND OF THE INVENTION

1. Field of the Invention

The present invention relates to apparatus and methods for connecting tubular materials to construct various articulated products such as furniture, shelving, small buildings and the like. More particularly, the invention pertains to apparatus and methods for joining a plurality of tubular materials such as metal electrical conduit or pipe to fabricate various articulated structures and frameworks therefor.

2. State of the Art

As a horticulturist, I have sought to create a portable greenhouse and associated products which are lightweight, weather-resistant, strong, and which are easily and quickly assembled (and taken apart) by the average adult from readily obtained and/or inexpensive materials.

Currently, lightweight greenhouse structures which are considered to be lightweight may be formed by several methods. Typically, construction involves the cutting, bending and welding of steel or aluminum pipe into frameworks or sections which may be assembled into a desired structural framework. The framework is typically covered with a variety of materials, such as thin plastic and/or aluminum sheeting or film. Where a structure is designed to be periodically dis-assembled and stored, pipe fittings are used which involve screwing/unscrewing of pipe sections, or removal of fasteners from each fitting. However, conventional pipe fittings and pipe used to make the frame members are relatively expensive, and the time and expense in welding/brazing pipe fittings onto the pipe are also appreciable. Inasmuch as iron and steel pipe rust quickly, galvanized or stainless steel pipe may be used, but are much more expensive. If galvanized pipe is used, welding or brazing results in generation of toxic zinc fumes, and the high temperature produces local de-galvanization, rendering the pipe subject to oxidation. Aluminum pipe is relatively expensive, and stainless steels are too expensive for general use in this application. Furthermore, the commercial fittings for joining pipe and tubing lack sufficient strength for this application, often being formed of white metal or aluminum. In the latter case, use of both aluminum and ferrous metal in the same structure will result in severe electrochemical corrosion, as is well known.

This inventor tried for many years to find or create joints/connectors for interconnecting conventional pipe and tubing into structures. Galvanized electrical conduit is a very attractive material for forming structures, inasmuch as it is (1) resistant to oxidation, (2) very lightweight, (3) strong, (4) easy to use, and (5) inexpensive. Furthermore, galvanized conduit is readily available in a variety of sizes, including nominal ½ inch, ¾ inch, 1 inch, 1½ inch, and 2 inch sizes, and larger. However, the commercially available connectors for joining conduit have insufficient rigidity and strength for effectively forming free-standing articulated structures therefrom.

An example of a conventional pipe connector is shown in U.S. Pat. No. 3,921,360 to Baldwin. The connector is shown as an irregular polyhedron with 12 surface structures and screw-threaded receivers for eight threaded struts. The device has a complex internal structure, requires repeated threading operations. Furthermore, parallel struts are not achievable with this connector.

In U.S. Pat. No. 4,925,330 to Cornish, a six-way connector is described which has surfaces to which structural elements may be attached by four screws apiece. The structural elements are of a complex construction and must be provided with ends which match the connector ends. Use with ordinary tubular materials is not in view. The thin walls of the connector appear to be subject to bending under relatively mild loading.

U.S. Pat. No. 5,556,219 to Mason shows a connector comprising a hemispherical member with a plurality of non-circular projections having a post. A flexible tubular member with precisely formed holes may be placed over a projection and squeezed to compress the member, permitting sliding the member over the post until it enters one of the holes.

In U.S. Pat. No. 6,032,430 to Soukup, up to six elongate bars are held in annular sleeves, and the sleeve ends compressed in an array to hold them in place.

U.S. Pat. No. 6,108,984 to Davidson teaches the connection of up to six struts of a geodesic dome in a connector having cylindrical fingers extending from a central member. The fingers and tubes have matching machined ends whereby a tube may be inserted in a finger and rotated for retention therein. The system is complex and requires special machining.

In U.S. Pat. No. 5,273,633 to Husson et al., an assembly node is shown which comprises two half-dome portions with holes for insertion of tubular elements therein. Bolts are passed through holes in the tubular elements and screwed to the assembly node to hold the elements in place.

U.S. Pat. No. 6,413,004 to Lin describes a tube connector which comprises a six-way connector with tubular ends having slits and projecting retaining members. A tube having a small opening near its end may be passed over a tubular end until the projecting retaining member snaps into the small tube opening to retain it in place. The connector is complex to form and is limited in angular adaptability.

A primary object of the present invention is to make available a system for joining a plurality of common tubular materials in a manner which is simple, for easy and quick assembly/disassembly of an almost limitless range of useful apparatus. It is also an object to make available such a system which is lockable, capable of carrying heavy loads without bending or breaking, and resistant to deterioration.

BRIEF SUMMARY OF THE INVENTION

The present invention is a high-strength connector block which will join up to round tubular materials for the fabrication of various structures. Up to seven sections of conventional steel electrical conduit, metal tubes, standard metal piping, plastic pipe, and the like may be joined to a single connector block to project therefrom in the X, Y and Z axes, as well as at an intermediate angle from the X. Y, and/or Z axis. The tubular diameter may vary, depending on the size of the structure to be fabricated. In general, the outer diameter of the tubular material may vary from about one-quarter inch to about 3 inches, but may be smaller or larger for particular purposes.

A preferred embodiment of the connector block comprises a three-dimensional block with seven generally planar sides. This embodiment has two major parallel sides which are substantial mirror images of each other. In a preferred configuration, each of the two major sides is rectangular with one corner truncated to form the seventh side. Three tube-carrying parallel through-apertures pass through the block to join the major sides. Each of the three through-apertures intersects a fourth or both of a fourth and fifth other apertures at right angles. One of the fourth and fifth apertures is a through-aperture. In addition, a sixth aperture formed on the seventh side is at an intermediate angle with the fourth and fifth apertures, e.g. typically at 45 degrees. While the central axes of the first, second and third apertures are parallel, the central axes of the third, fourth and fifth apertures lie in a single plane perpendicular to the axes of the first, second and third apertures.

The connector block is formed of a dense, rigid, high strength material, such as a polymer meeting these criteria For example, a material such as high density polyethylene (HDPE) has been found to have the physical and chemical characteristics which provide unique utility, inasmuch as when formed with carbon black, it is very resistant to damage from solar radiation and temperature extremes. Its chemical resistance is also very high. Furthermore, it may be obtained as a relatively inexpensive product recycled from used milk containers. Other materials may also be used, such as for example, various types of polypropylene which are configured for the required high strength and rigidity. Another material which may be advantageously used is polycarbonate. Any polymeric material may be used which provides the requisite strength, rigidity, workability and life for the particular structure to be formed.

When formed of HDPE, the connector block is designed to have a minimum side dimension of at least about 1.8 times the total of aperture diameters in a straight line across the side. Thus, a connector block having the dimensions 3½ inch×3½ inch×2 inches thicknness will readily accommodate nominal one-inch tubing with an actual outside diameter (OD) of about 15/16 inch.

In a preferred form, pilot holes are formed in the connector block by which lockscrews may be screwed into any or all of the inserted tubular members to rigidly retain the members within the block. Four pilot holes serve as insertion points for lockscrews, enabling lockage of all tubular members inserted in the block.

The initial intent of the inventor was to create a frame for a portable greenhouse. However, additional structures formed with the connector blocks include horticultural cold frames, pop-up tents, cabanas, boat covers, and ice-fishing shanties. The connector blocks of the invention have been used to fabricate a wide variety of other structures, including for example, furniture including tables, chairs, shelves, and the like. In addition, such items as work benches, storage and display racks and shelves, tool racks, tool boxes, saw horses, scaffolding, stereo racks, bed frames, safety railing, ladders, trellises, shelters for motor vehicles, tents for outdoor public events, boat covers, and a wide range of other items may be easily fabricated from readily available tubular materials and the connector blocks described herein. For large structures, e.g. large commercial greenhouses, a frame may be formed using e.g. nominal 1½ to 2 inch tubular materials and connecting blocks having a long dimension of about 6 inches to about 8 inches, respectively.

The connector block of this invention enables the construction of strong rigid structures of a wide variety of useful configurations and sizes. Readily-available tubular materials may be adapted for the particular structure. The structure so formed is lightweight and may easily be taken apart for storage or moving. The method for creating a structure is simple and straightforward, simply comprising cutting the tubular members to a desired length, inserting into the desired aperture of the connector block, and locking the tubular member at a desired position therein with a lockscrew. Disassembly is simply accomplished by removing the lockscrews and pulling the tubular members from the apertures. Various objects may be attached to the structure, such as panels of double-pane plastic, solid planar panels, corrugated panels, flexible plastic, and various structural members and electrical fixtures.

BRIEF DESCRIPTION OF THE SEVERAL VIEWS OF THE DRAWINGS

The nature of the present invention including its various embodiments may be more clearly understood by reference to the following detailed description of the invention, to the appended claims, and to the several drawings herein, wherein:

DETAILED DESCRIPTION OF THE INVENTION

In use and operation, and referring to FIGS. 1, 2, 3 and 4, the invention comprises a connector block 10 for rigidly retaining tubular members 82 such as rigid pipe, rigid tubing, and electrical conduit in a configuration of a desired structure 90. The tubular members may be made of metal, plastic, glass, ceramic, etc. The connector block 10 is shown as a generally orthogonal solid having a first major side 12 and a parallel second major side 14 spaced apart a distance 64. The two major sides 12, 14 are joined peripherally by five minor sides 16, 18, 20, 22, and 24, of which side 24 is shown as a truncation of a corner of the major sides 12, 14.

Figure 12:
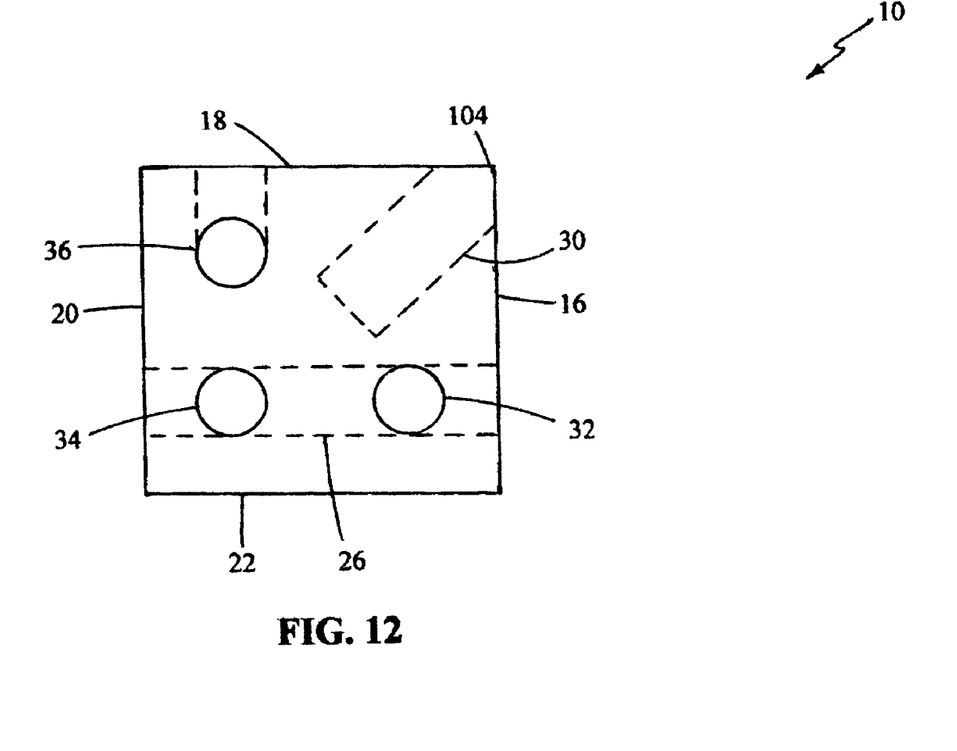
FIG. 12 is a front view of an embodiment of the connector block having six sides in accordance with the invention.
Figures 13, 14:
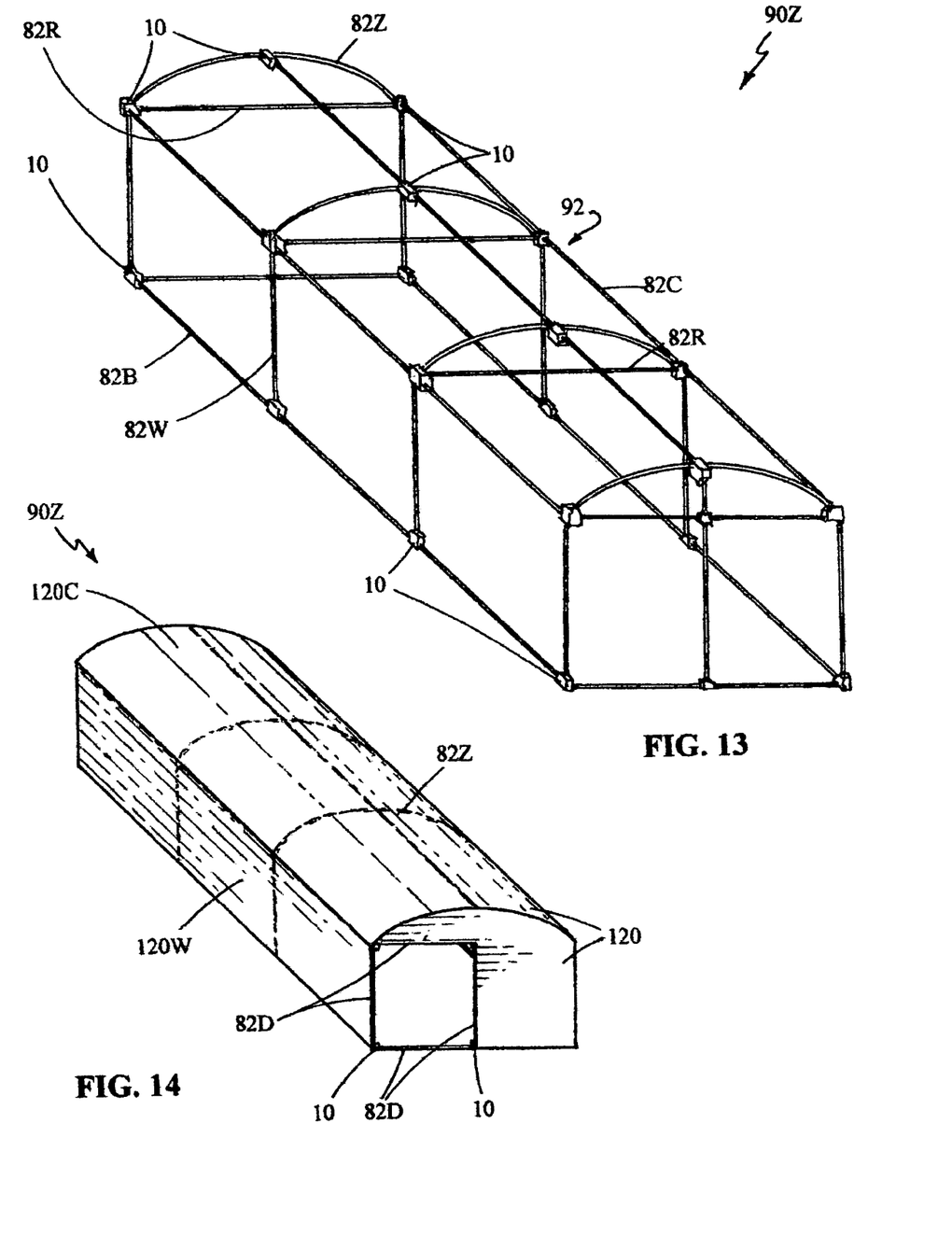
FIG. 13 is a perspective view of an exemplary lightweight building frame having arcuate tubular roof materials connected to connector blocks in accordance with the invention.
FIG. 14 is a perspective view of an exemplary lightweight building frame with an attached covering.

It should be noted that the connector block 10 could be formed without the seventh side 24, whereby aperture 30 is drilled through the corner 104 of the block without truncation, as depicted in FIG. 12. In this variant, however, the utility of the connector block 10 is somewhat diminished, particularly when used in a two-block joint 88, because the block then lacks a surface, i.e. side which is at an intermediate angle 80 e.g. 45 degrees, with the orthogonal sides of the connector block. In general, the range of intermediate angles which are most useful is from about 20° to about 70° from the vertical. More preferably, the intermediate angle is between about 30° and 60°. In general, the most useful intermediate angle has been found to be about 45°.

Figure 1:
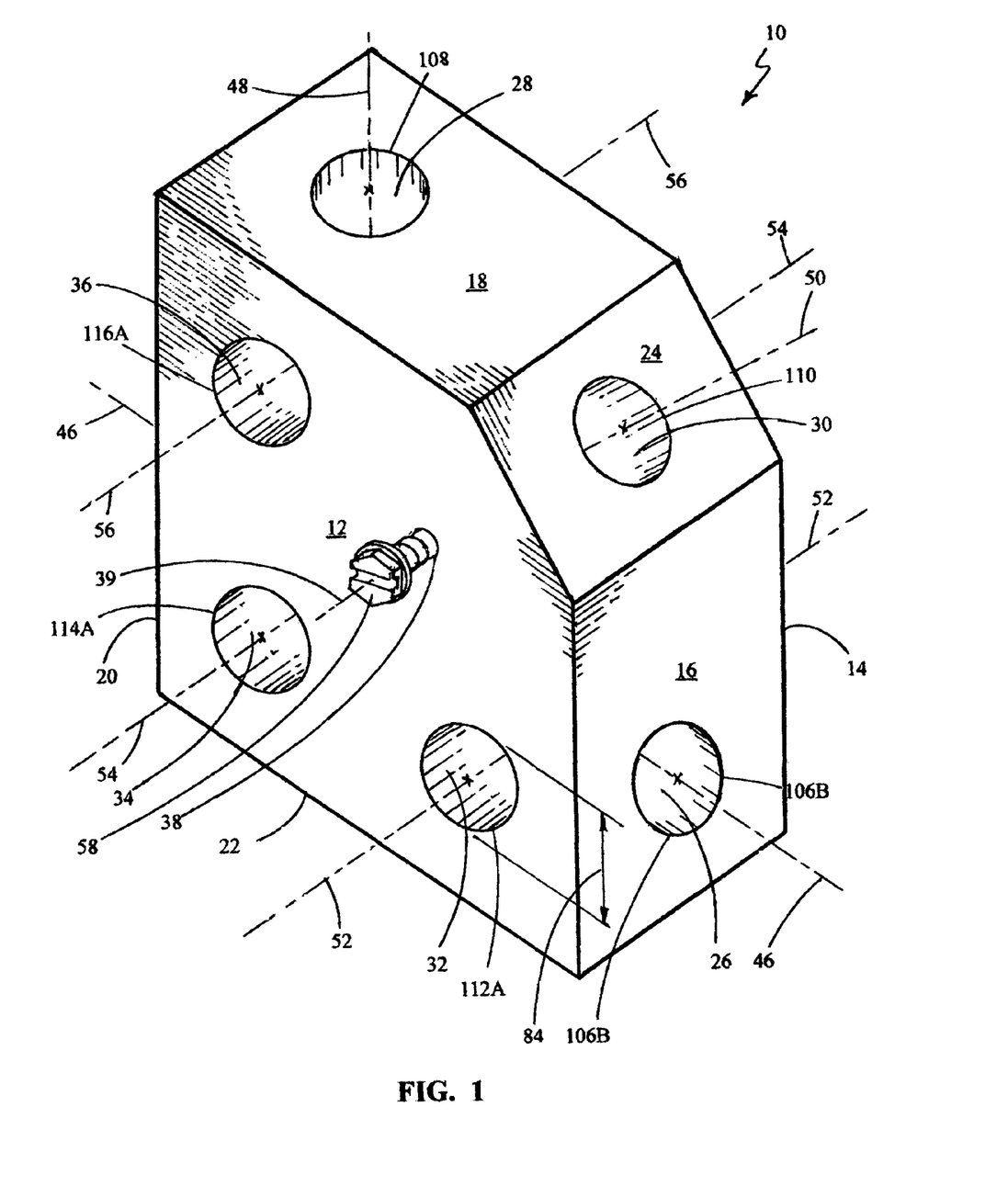
FIG. 1 is an isometric view of an exemplary connector block of the invention.
Figure 2:
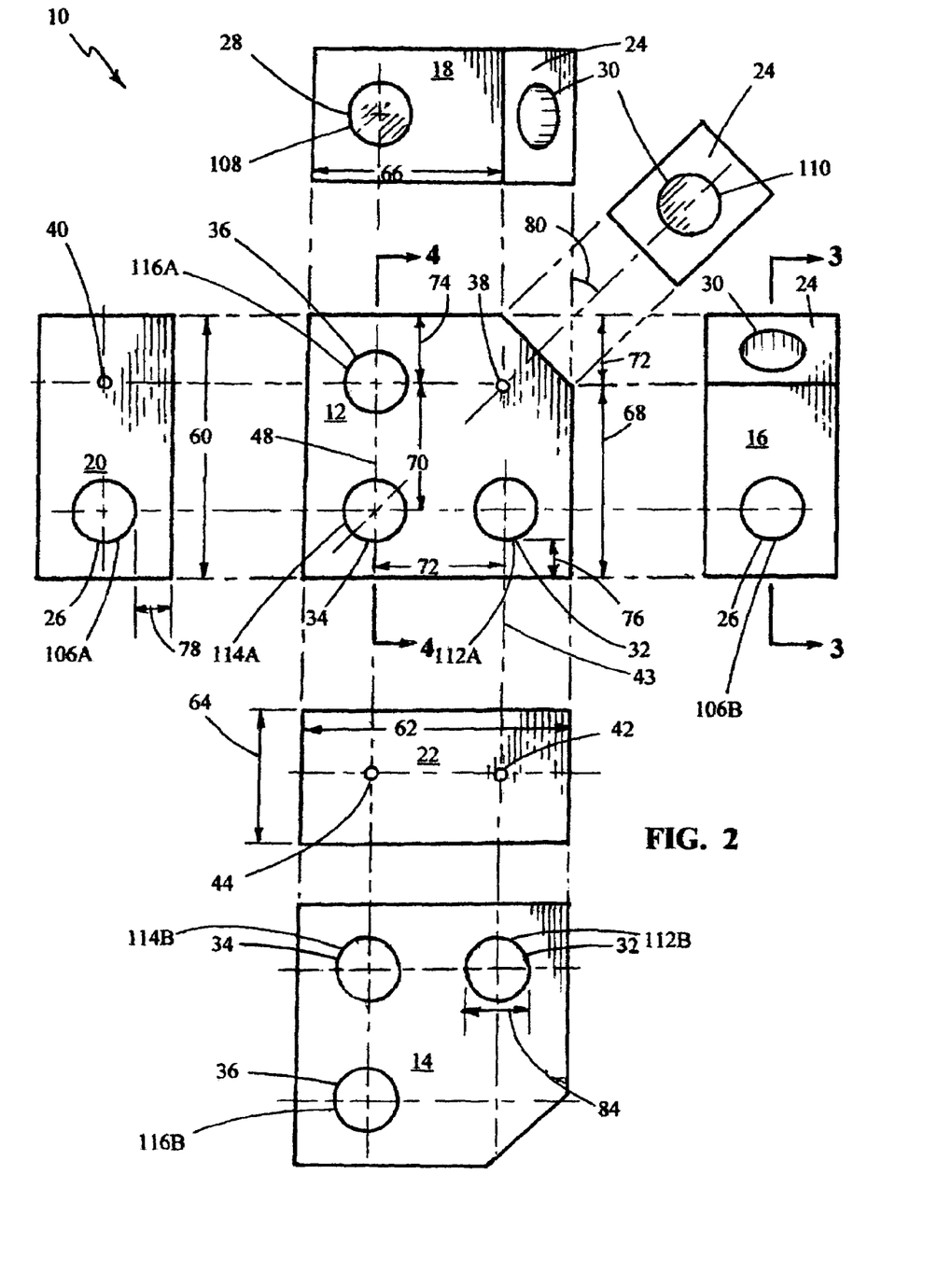
FIG. 2 is a plan view of the seven sides of an exemplary connector block of the invention.
Figure 3:
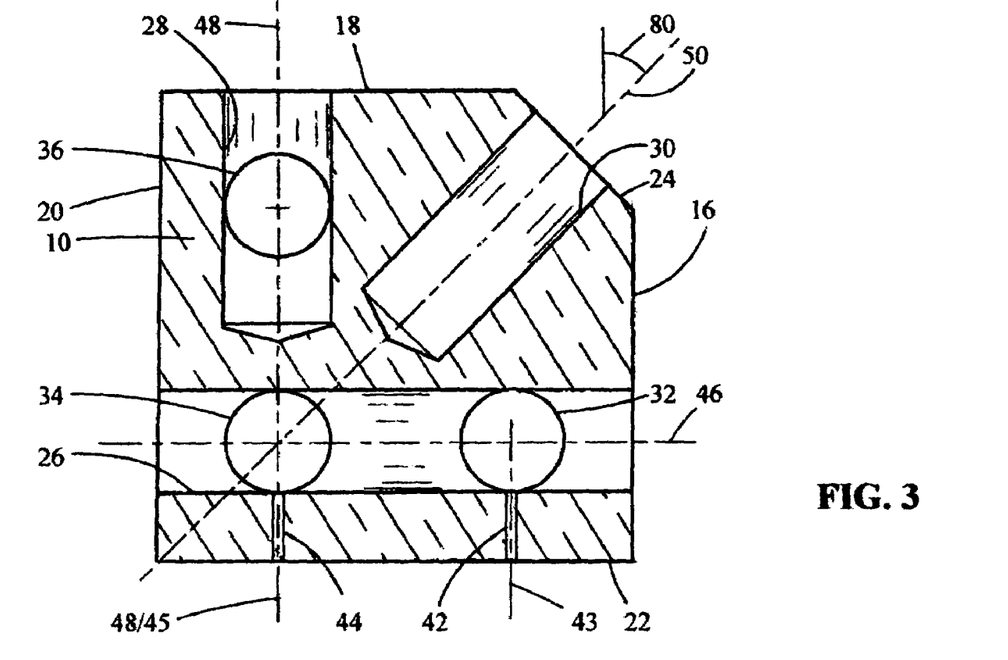
FIG. 3 is a cross-sectional view through an exemplary connector block of the invention, as taken along line 3—3 of FIG. 2.

In this discussion, side 12 is denoted as a front side, side 14 is denoted as a back side, side 16 is denoted as a right side, side 18 is denoted as an upper side, side 20 is denoted as a left side, side 22 is denoted as a bottom side, and side 24 is denoted as a truncate side. The bottom side 22 is the only side without an aperture for receiving a tubular member 82. The names assigned to the various sides and apertures are for ease of understanding and for correlating the drawings to this written description. In fabrication of a structure, the connecting blocks 10 may be positioned in any useful position for connecting tubular members 82.

Each of the apertures 26, 28, 30, 32, 34, and 36 is formed to fit snugly about a rigid tubular member 82 of a specified outside diameter. The tubular member 82 may alternatively be solid rather than hollow, although hollow (cylindrical) members are seen as the primary application. The tubular member 82 may be metal, plastic, carbon-impregnated plastic, or another material such as glass, for example, depending upon the desired structure and use thereof. A tubular member 82 may be essentially rigid, or may alternatively be flexible. In the latter instance, a structure with arcuate portions may be formed. Although all apertures 26, 28, 30, 32, 34 and 36 are typically of the same round bore diameter 84, the connector block 10 may optionally incorporate apertures of differing bore diameters 84 for making certain specific structures with tubular members of differing diameters.

The central axes of each aperture are designated as follows:

| Aperture No. | Central Axis No. |
|---|---|
| 26 | 46 |
| 28 | 48 |
| 30 | 50 |
| 32 | 52 |
| 34 | 54 |
| 36 | 56 |

Figure 4:
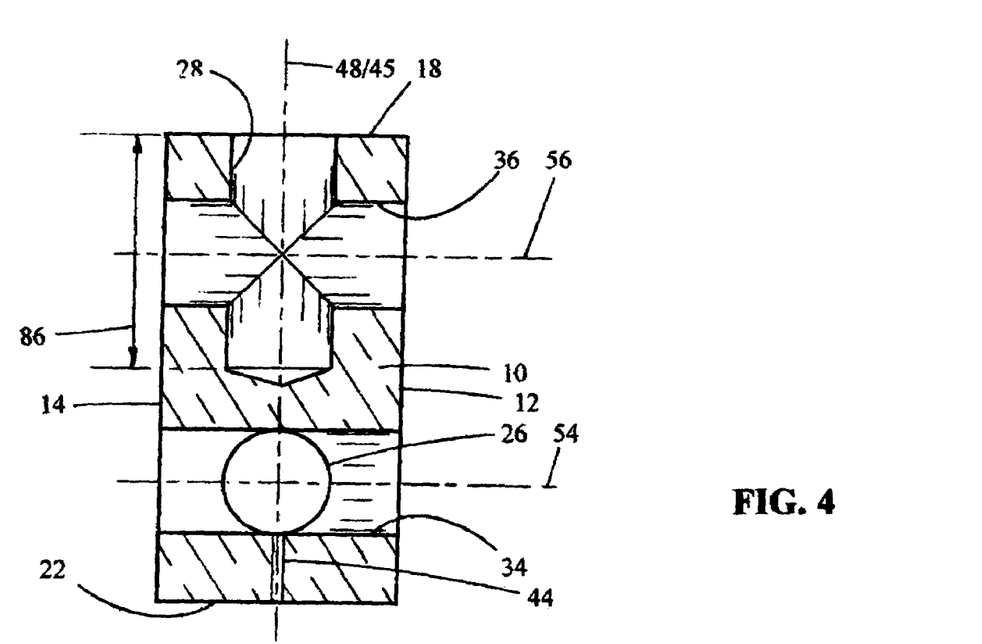
FIG. 4 is a cross-sectional view through an exemplary connector block of the invention, as taken along line 4—4 of FIG. 2.
Figure 5A:
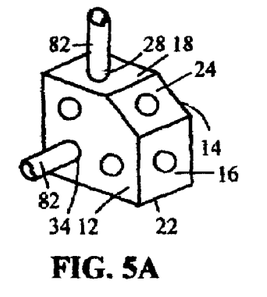
FIGS. 5A through 5J are perspective views of an exemplary connector block of the invention, showing methods for creating various 90° L-shaped structure connections.
Figure 5B:
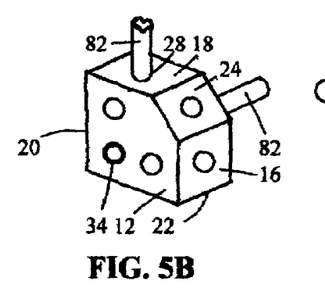
Figure 5C:
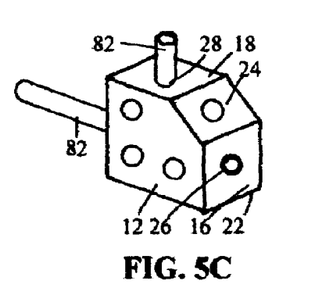
Figure 5D:
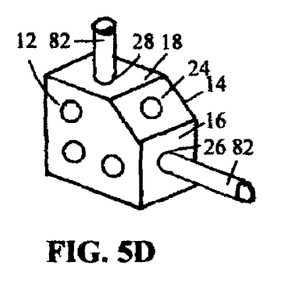
Figure 5E:
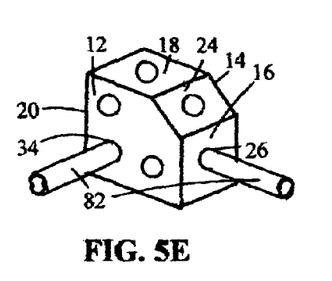
Figure 5F:
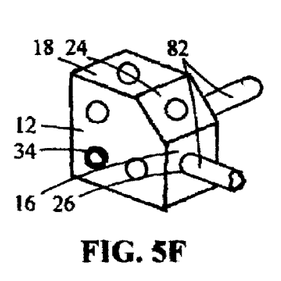
Figure 5G:
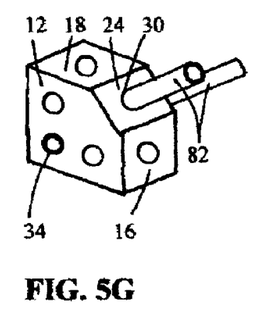
Figure 5H:
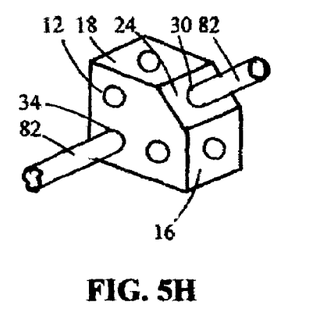
Figure 5I:
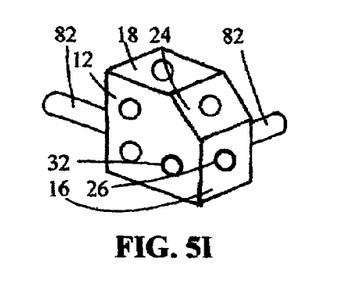
Figure 5J:
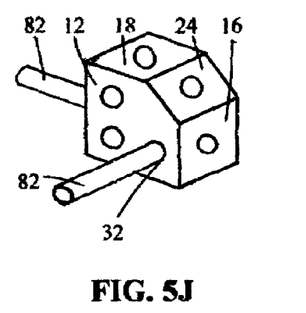
Figure 6A:
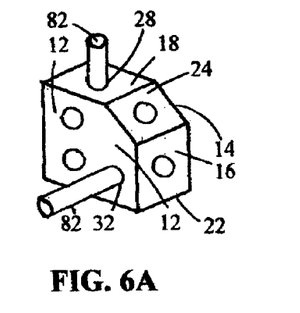
FIGS. 6A through 6J are perspective views of an exemplary connector block of the invention, showing methods for creating various off-set 90° L-shaped structure connections.
Figure 6B:
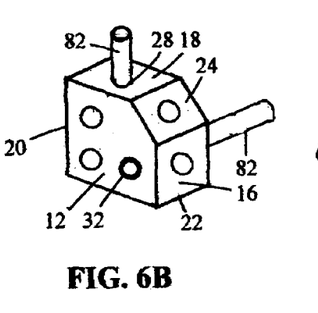
Figure 6C:
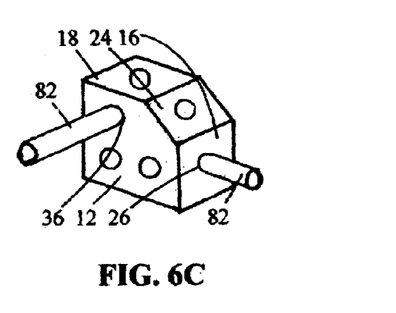
Figure 6D:
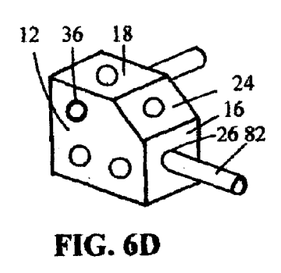
Figure 6E:
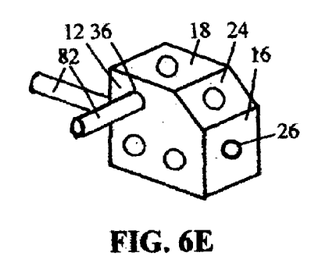
Figure 6F:
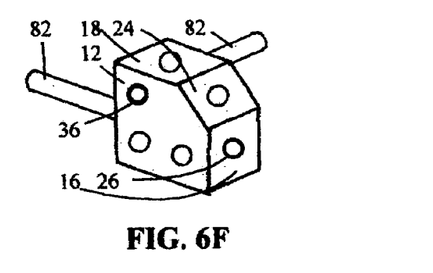
Figure 6G:
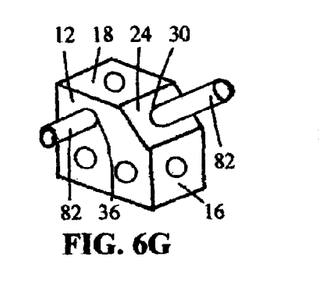
Figure 6H:
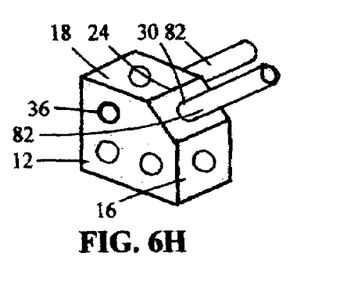
Figure 6I:
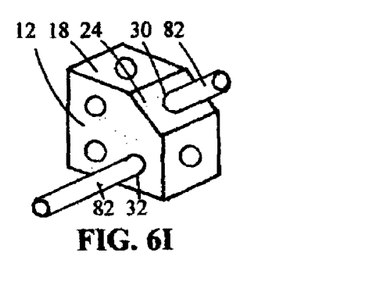
Figure 6J:
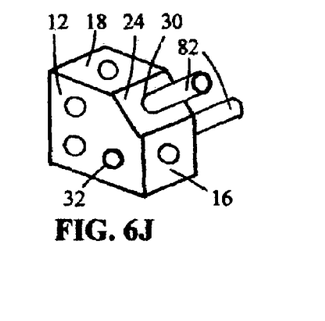
Figure 7A:
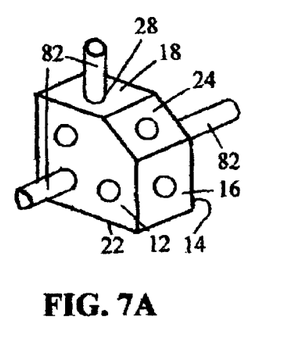
FIGS. 7A through 7E are perspective views of an exemplary connector block of the invention, showing methods for creating various 90° T-shaped structure connections.
Figure 7B:
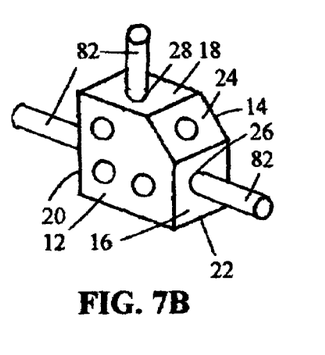
Figure 7C:
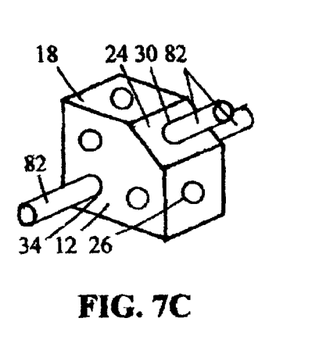
Figure 7D:
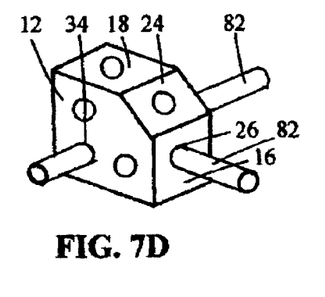
Figure 7E:
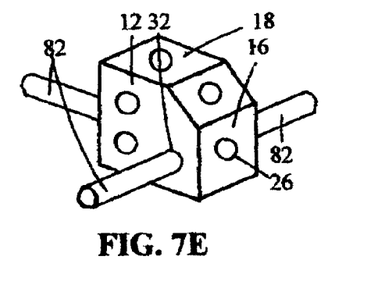
Figure 8A:
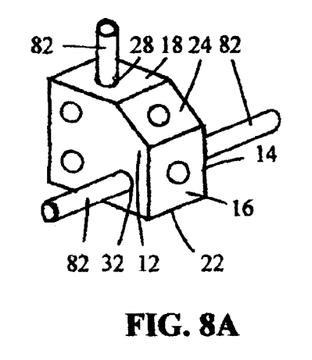
FIGS. 8A through 8G are perspective views of an exemplary connector block of the invention, showing methods for creating various off-set 90° T-shaped structure connections.
Figure 8B:
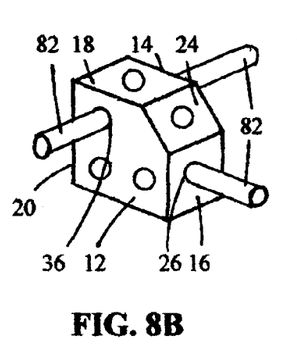
Figure 8C:
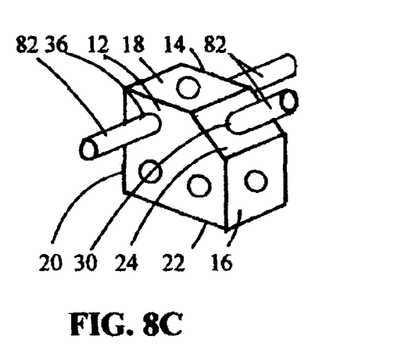
Figure 8D:
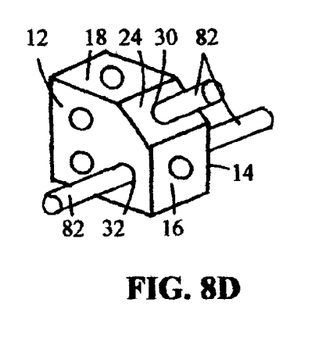
Figures 8E, 8F:
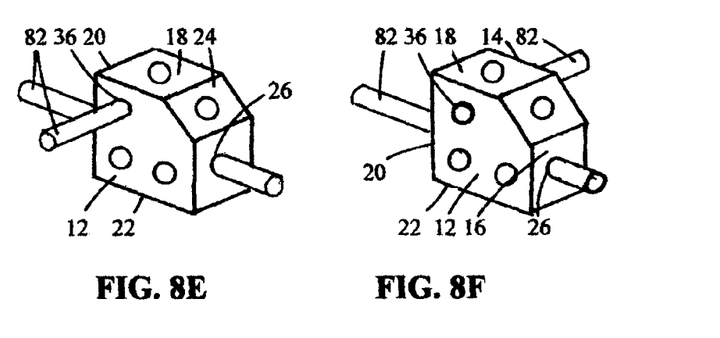
Figure 8G:
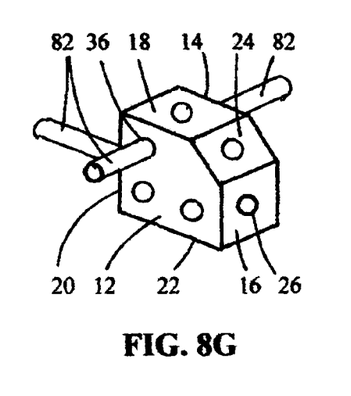

It should be noted that as depicted in FIG. 2, each of the through-apertures 26, 32, 34, and 36 has openings on two sides of the connector block 10. Thus, aperture 26 has a left opening 106A and a right opening 106B. Aperture 32 has a front opening 112 A and a rear opening 112B. Aperture 34 has a front opening 114A and a rear opening 114B. Aperture 36 has a single opening 116A and a rear opening 116B. Each of the non-through-apertures 28 and 30 has a single opening 108 and 110, respectively. The depth 86 of non-through-apertures 28 and 30 is preferably about one-half of the available dimension of the connector block 10. Thus, for example, as shown in FIG. 4 the depth 86 of non-through-aperture 28 is about 0.5 times the distance between side 18 and side 22.

The strength and rigidity of a structure formed of connector blocks 10 depends upon the materials' resistance to bending and breakage. The block 10 must be of sufficient size to provide a web of block material between the outside of the block and the insert tubular member 82. When formed of HDPE, the connector block 10 may be designed to have a minimum side dimension of at least about 1.8 times the total of aperture diameters 84 in a straight line across the side. Thus, for example, an HDPE connector block 10 having the dimensions 3½ inches wide×3½ inches high×2 inches thick will provide sufficient strength for most structures using tubular members 82 of nominal one-inch electrical (EMT) conduit having an actual outside diameter (OD) of about 15/16 inch. Likewise, the minimum distance between a central axis of an aperture to a side of the block 10 is 0.4 times the aperture diameter 84. Apertures 28 and 30 will preferably have a bore depth 86 of about 1¾ inch, even though in most cases a shorter depth is adequate.

At least 4 pilot holes, designated 38, 40, 42, and 44, are formed in the connector block 10 to intersect (or nearly intersect) the central axes of the apertures. Lockscrews 58 may be screwed into the pilot holes 38, 40, 42, and 44 to intersect the inserted tubular members 82. Pilot hole 38 is directed at a generally middle portion of aperture 30. Pilot hole 40 is directed at the intersection of apertures 28 and 36. Pilot holes 42 and 44 are directed at the intersection of apertures 26 and 32, and apertures 26 and 34, respectively. The lockscrew 58 may be any strong threaded screw which may be driven into the pilot hole and into/through the wall of the tubular member 82. Typically, contact of a lockscrew 58 with a tubular member 82 may be sensed by additional resistance when turning the screw. Thus, the tubular member 82 may be lightly locked by turning the screw a short distance following contact. More "permanent" locking will result from turning the lockscrew 58 further into or through the wall of the tubular member 82. In either case, reversing the lockscrew 58 will enable the tubular member 82 to be released from the connector block 10 and removed.

As already indicated, the connector block 10 is formed of a material with sufficient strength and rigidity for forming a particular structure. Such materials include various grades of polyethylene, polypropylene, polycarbonate and other polymers. In a preferred form, the connector block 10 is formed of high density polyethylene (HDPE) to which an ingredient such as carbon black may be added to protect the block from ultraviolet light damage. HDPE is commercially extruded in "stock lumber sizes" for use in the building trades, such as for constructing outdoor decks and patios. Colorants are sometimes added to this "artificial lumber" for aesthetic purposes. The material is typically made from recycled plastic beverage containers. Thus, the material is "environmental-friendly" as well as relatively inexpensive. In summary, this HDPE material is very strong, lightweight, rigid, weather-proof, and virtually unaffected by solar exposure.

The connector block 10 may be made by first cutting stock material to the required dimensions of each side 12, 14, 16, 18, 20, 22, and 24. Apertures 26, 28, 30, 32, 34 and 36 are then drilled in block 10, as are pilot holes 38, 40, 42, and 44.

Alternatively, the connector block 10 may be formed by molding, e.g. by a conventional injection molding process.

The molding process may include the molding of some or all of the apertures. For example, through-apertures 32, 34, and 36 may be formed in the molding step, and apertures 26, 28 and 30 later formed by drilling.

Turning now to FIGS. 5A through 5J, ten configurations for forming a 90° L connection of tubular members 82 with a connector block 10 are illustrated. As seen, the axes of the various L connections include the X axis, Y axis, Z axis and an axis 50 of intermediate angle 80 (see FIGS. 1 and 2).

In FIGS. 6A through 6J, ten configurations of an "off-set" 90° L connection of tubular members 82 with the connector block 10 are shown. The connections are noted as being "off-set" inasmuch as the respective connector blocks 10 are at right angles to each other in at least one view, although their axes do not meet.

In FIGS. 7A through 7E, five different configurations of a 90° T connection are shown, in which tubular members 82 are held in a connector block 10 of the invention.

FIGS. 8A through 8G depict seven different configurations of an "off-set" 90° T connection formed of tubular members 82 inserted into a connector block 10 of the invention. In each of these configurations, the central tubular member 82 of the "offset" T connection is offset from the base member(s).

The connector block 10 of the invention enables various connections of FIGS. 5 through 8 (as well as other connection configurations) to be combined to form a wide variety of structures. An example of such a structure is an 8 foot by 20 foot backyard articulated greenhouse frame 92 shown in FIGS. 9, 9A and 9B.

Figure 9:
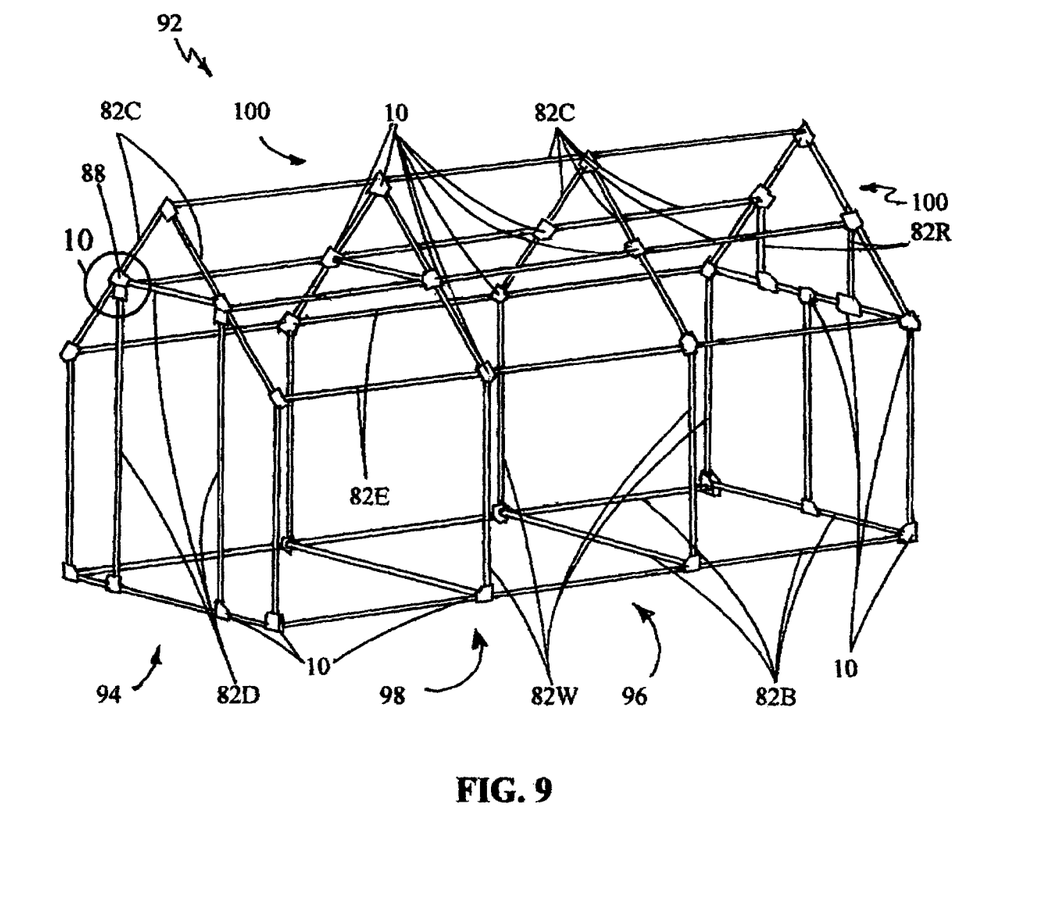
FIG. 9 is a perspective view of an exemplary lightweight building frame fabricated of connector blocks of the invention and tubular materials.
Figure 9A:
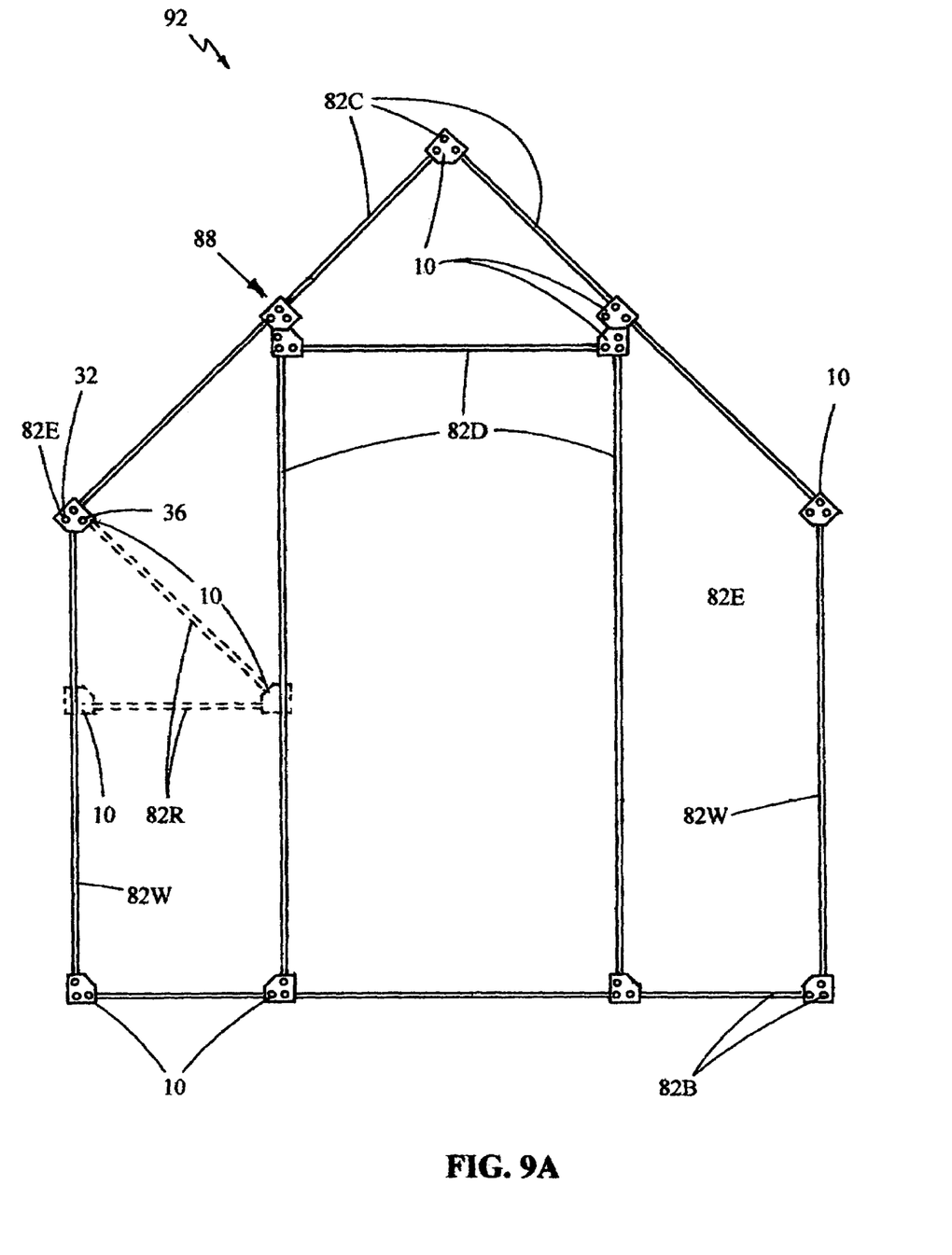
FIG. 9A is a front view of an exemplary lightweight building frame fabricated of connector blocks of the invention and tubular materials.
Figure 9B:
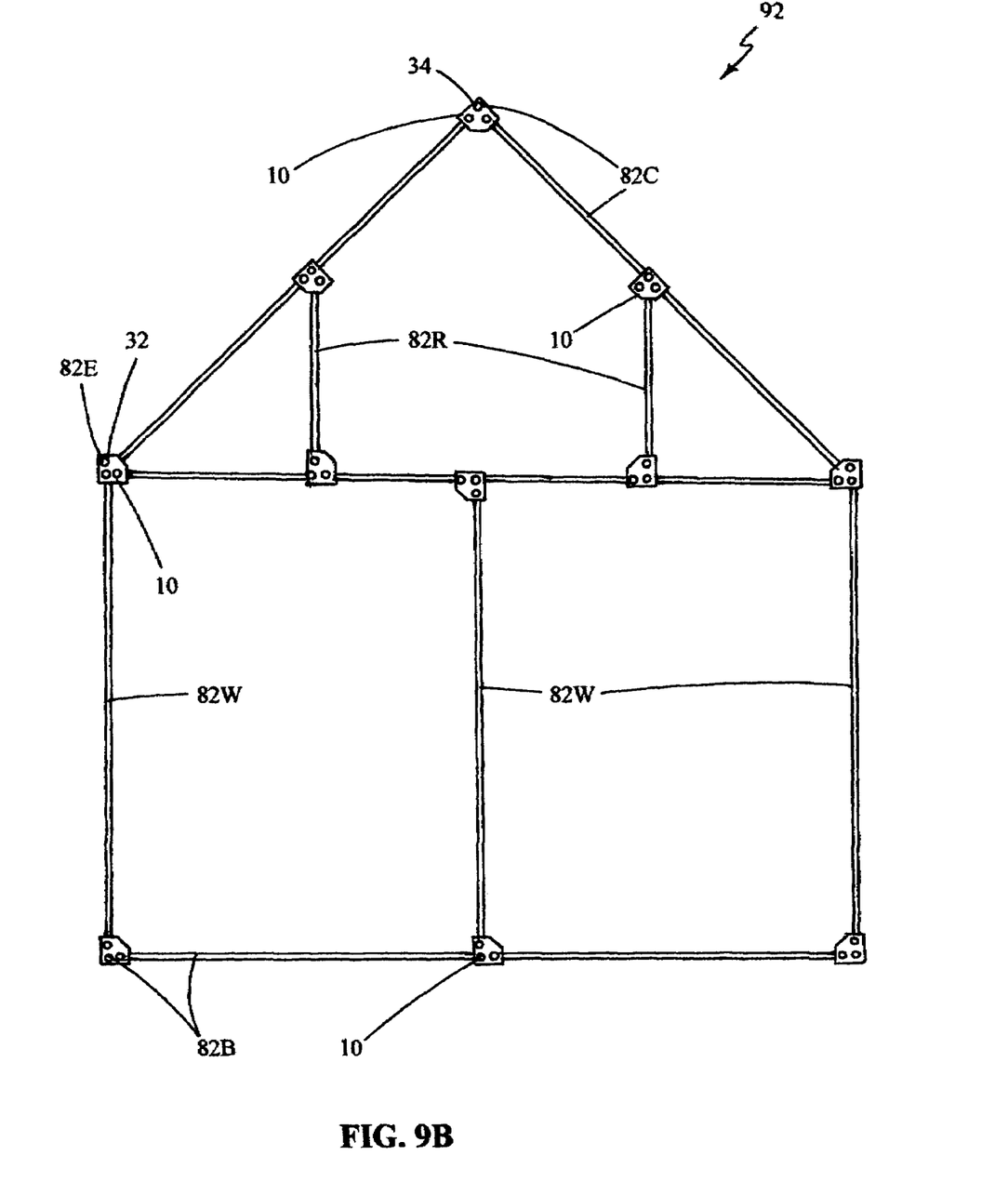
FIG. 9B is a rear view of an exemplary lightweight building frame fabricated of connector blocks of the invention and tubular materials.

The greenhouse frame 92 is shown with a base frame 96 with tubular members 82B, wall frames 98 with tubular members 82W, door frame 94 with tubular members 82D, roof frame 100 with tubular members 82C and reinforcement members 82R. Additional cross-members may be inserted in nearly any location of the greenhouse frame 92, using the existing connector blocks 10, or by additional connector blocks. Obviously, the greenhouse frame 92 may be of any size merely by shortening or lengthening the appropriate tubular members. Of course, the diameter of the tubular members 82 and size of the connector block 10 will be larger as the span length of the members 82 is increased. This exemplary small structure may be made by interconnecting nominal ¾ inch or one-inch tubular members in 3½ inch×3½ inch connector blocks 10, for example. Typically, rigid plastic, flexible plastic sheet, or dual-pane plastic panels are used to enclose the greenhouse frame 92, using conventional connecting devices known in the art. Such devices include elongate vinyl extrusions which snap together and are glued to the tubular members 82, as well as various clips and purlins. Alternatively, panels may be clamped between two elongate clamping members screwed to tubular members 82 between the connector blocks 10.

It is evident that for many of the structures which may be made with the connecting block 10 and tubular members 82, other materials may be required to complete the desired apparatus. For example, furniture frames may be covered with wooden seats, wooden table tops, cabinet tops, etc. The connecting block 10 of the invention is advantageous in that screws may be driven into the block to attach other components. For example, as shown in FIG. 9A, connector blocks 10 mounted on doorway member 82D may be used for attaching door hinges (not shown).

At many joints, not all of the aperatures in the connector block 10 are utilized. Thus, apertures not used to attach a tubular member may be used to accept other members of an apparatus. Thus, for example, additional reinforcement members 82R may be used. Other items such as light fixtures, hooks, hangers, handles or hanging shelf members may also be inserted into apertures, or otherwise mounted by screws, as desired.

As shown by comparing FIG. 9A with FIG. 9B, many joints may be formed in more than one way. In FIG. 9A, the connector block 10 joining a vertical wall member 82W, roof member 82C and eave member 82E has its eave member 82E passing through aperture 32 and the roof member 82C in aperture 26. However, in an alternative construction, eave member 82E may pass through aperture 36 instead, without changing the block orientation. Also, in FIG. 9B, the connector block 10 joining vertical and horizontal wall members to the eave member 82E and roof member 82C has roof member 82R within aperture 30 on the truncate side 24. Eave member 82E passes through aperture 32, but it is evident that the block 10 is rotated 135° from the configuration in FIG. 9A.

As depicted in FIG. 9B, the roof members 82C are joined at a ridge top to a horizontal roof member 82C passing through aperture 34 of the connector block 10.

Figure 10:
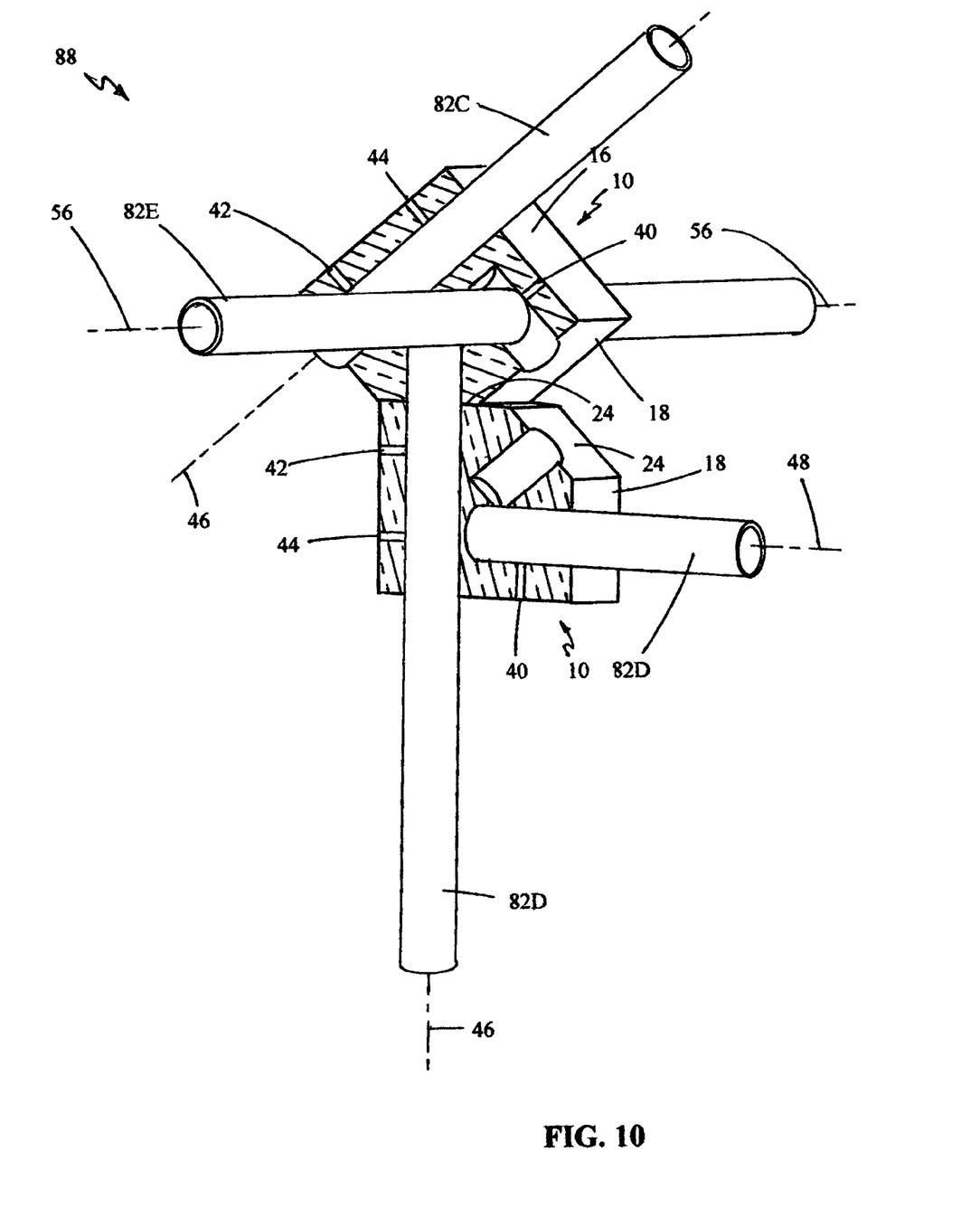
FIG. 10 is an enlarged cross-sectional perspective view of a roof-to-sidewall connection formed of two adjacent connector blocks in accordance with the invention, as taken from circle 10 of FIG. 9A.
Figure 11:
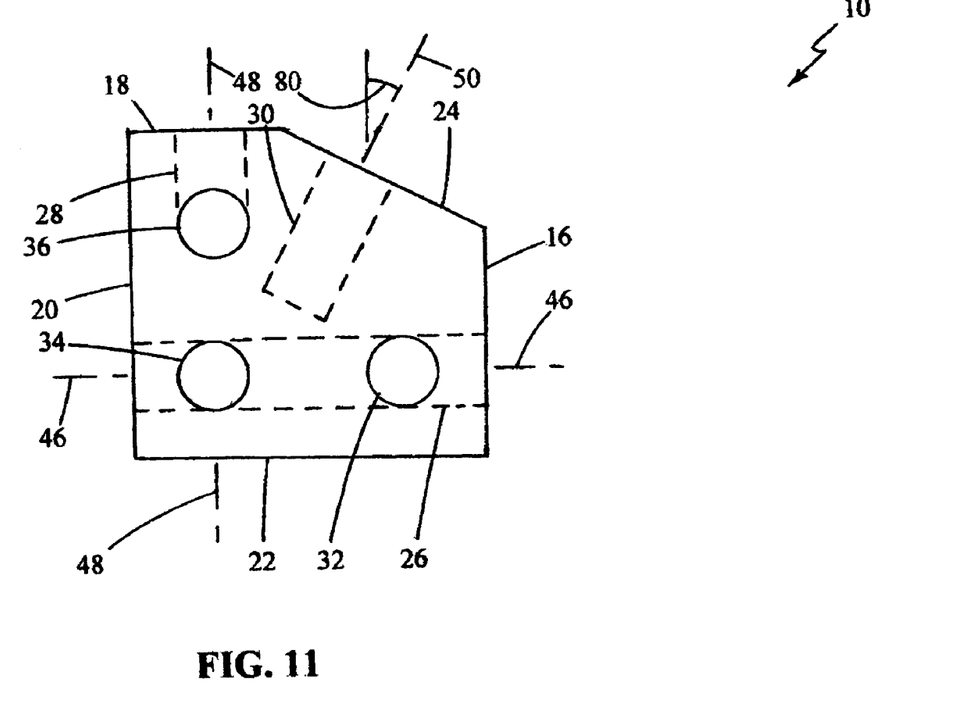
FIG. 11 is a front view of a connector block of the invention in which the angle of one aperture is other than 90 degrees or 45 degrees from vertical.

A multi-block assembly 88 may be used to expand the capability of the connection block 10. For example, as shown in FIG. 9A and FIG. 10, a two-block connection assembly 88 interconnects a roof rafter tubular member 82C with a vertical wall member 82D and an elongate eave tubular member 82E. A lower connection block 10 retains vertical and horizontal wall members 82D, while an upper connection block 10 retains the roof tubular member 82C and the eave tubular member 82E. The two connector blocks 10 are held together by the vertical wall member 82D, and by the structure 92 itself It should be noted that connector blocks 10 may be made with a non-orthogonal angle 80 different from 45 degrees, as shown in FIG. 11. Thus, a framework structure such as a greenhouse framework 92 may be made with a roof pitch (vertical/horizontal) other than 1:1 (vertical:horizontal), using connector blocks 10 in which the angle 80 between axis 50 and axis 48 is not 45 degrees. For example, a roof having a pitch of 1:2.5 may be created using an angle 80 of about 22 degrees. The truncate side 24 of the connector block 10 will be formed to be perpendicular to axis 50. In the event that angle 80 significantly varies from 45 degrees, the connector block 10 may be lengthened in one of dimensions 60 or 62 to maintain sufficient block material between aperture 30 and apertures 26 and 36.

The connector block 10 of the invention achieves the afore-stated objects, providing a simple, easy way to interconnect commonly available tubing, pipe, electrical conduit and the like tubular materials, as well as solid elongate materials such as round rods.

What is claimed is:

1. A connector block for interconnecting a plurality of tubular members to form a structure, said connector block comprising:
   a generally orthogonal block comprising:
      a first major planar side;
      a second major planar side spaced from and parallel to said first major planar side;
      first, second, and third parallel through-apertures joining said first and second major planar sides and having first, second and third central axis, respectively, for receiving tubular members;
      a bottom side joining said first and second major planar sides;
      a left side joining said first and second major sides and normal to said bottom side;

a right side parallel to said left side, said right side joining said first and second major sides and normal to said bottom side;

an upper side parallel to said bottom side, said upper side joining said first and second major sides;

a fourth through-aperture through said block for receiving a tubular member, said fourth through-aperture extending from said left side to said right side and intercepting said first and second through-apertures;

a first non-through-aperture for receiving a tubular member, said first non-through aperture on said upper side and intercepting said third through-aperture; and a second non-through aperture for receiving a tubular member, said second non-through aperture entering said block at an angle intermediate 0 degrees and 90 degrees from said first non-through-aperture.

2. A connector block in accordance with claim 1, wherein said first, second and third through-apertures are substantially parallel.

3. A connector block in accordance with claim 1, wherein all said apertures have a round cross-section with like diameter.

4. A connector block in accordance with claim 3, wherein said first and second central axes are generally equidistant from said bottom side, and spaced therefrom a minimum distance P1.

5. A connector block in accordance with claim 4, wherein said minimum distance P1 is approximately 0.4 times the aperture diameter.

6. A connector block in accordance with claim 3, wherein said second and third central axes are generally equidistant from said left side, and spaced therefrom a minimum distance P2.

7. A connector block in accordance with claim 6, wherein said minimum distance P2 is approximately 0.4 times the aperture diameter.

8. A connector block in accordance with claim 1, wherein said block is formed of an organic polymer.

9. A connector block in accordance with claim 1, wherein said block is formed of one of high density polyethylene (HDPE), polycarbonate, and polypropylene.

10. A connector block in accordance with claim 9, wherein said block includes a substance for resisting absorption of ultraviolet (UV) radiation.

11. A connector block in accordance with claim 1, wherein said intermediate angle is about 20° to about 70°.

12. A connector block in accordance with claim 1, wherein said intermediate angle is about 30° to about 60°.

13. A connector block in accordance with claim 1, wherein said intermediate angle is about 45°.

14. A connector block in accordance with claim 1, further comprising lockscrew pilot holes in said block to intersect with said apertures, whereby screws driven thereinto contact and/or pass into said tubular members inserted into said apertures.

15. A connector block in accordance with claim 13, wherein said lockscrew pilot holes comprise:

first and second lockscrew pilot holes entering said bottom side and directed to the intersection of said fourth through-aperture with said first through-aperture and the intersection of said fourth through-aperture with said second through-aperture, respectively;

third lockscrew pilot hole entering one of said major sides and directed to the intersection of said third through-aperture and said first non-through-aperture; and fourth lockscrew pilot hole entering one of said major sides and directed to said sixth aperture.

16. A connector block in accordance with claim 1, further comprising an angular side formed by truncating the corner between said upper side and said right side at an angle normal to the central axis of said second non-through-aperture.

17. A connector block in accordance with claim 1, wherein said tubular material comprises one of rigid pipe, rigid tubing, and rigid electrical conduit and is formed from one of metal, plastic, glass, ceramics, and combinations thereof.

18. A lightweight easily assembled/disassembled articulate structure formed of a plurality of sections of tubular material rigidly conjoined by connector blocks in accordance with claim 1.

19. A structure in accordance with claim 18, further comprising a plurality of semirigid panels attached to and covering a portion of said structure.

20. A connector block in accordance with claim 1, wherein said connector block is formed of a high density polyethylene prepared from recycled polyethylene containers.

* * * * *